(12) United States Patent
Sasakura et al.

(10) Patent No.: US 7,403,139 B2
(45) Date of Patent: Jul. 22, 2008

(54) ELECTRONIC APPARATUS AND CONTROL METHOD THEREOF USING SAMPLE RATE CONVERTER

(75) Inventors: Shuhei Sasakura, Osaka (JP); Tatsuya Adachi, Osaka (JP); Isao Kato, Osaka (JP); Kazuya Iwata, Osaka (JP); Naoki Ejima, Osaka (JP); Seiji Nakamura, Osaka (JP); Yoshihisa Inagaki, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 141 days.

(21) Appl. No.: 10/572,960

(22) PCT Filed: Sep. 17, 2004

(86) PCT No.: PCT/JP2004/014044

§ 371 (c)(1),
(2), (4) Date: Aug. 29, 2006

(87) PCT Pub. No.: WO2005/029717

PCT Pub. Date: Mar. 31, 2005

(65) Prior Publication Data

US 2007/0046819 A1    Mar. 1, 2007

(30) Foreign Application Priority Data

Sep. 22, 2003    (JP) ............................. 2003-330544

(51) Int. Cl.
H03M 7/00    (2006.01)
(52) U.S. Cl. ..................... 341/61; 370/468; 370/538; 370/465; 370/466

(58) Field of Classification Search ............. 341/61; 370/235, 464, 468, 538; 375/240.01
See application file for complete search history.

(56) References Cited

U.S. PATENT DOCUMENTS

| 5,978,036 | A | 11/1999 | Higa et al. |
| 6,539,065 | B1 | 3/2003 | Furukawa |
| 6,891,854 | B2 * | 5/2005 | Zhang et al. ............... 370/468 |

FOREIGN PATENT DOCUMENTS

| JP | 5-14133 | 1/1993 |
| JP | 9-247632 | 9/1997 |
| JP | 11-164227 | 6/1999 |
| JP | 2000-115120 | 4/2000 |
| JP | 2001-44866 | 2/2001 |

\* cited by examiner

*Primary Examiner*—Rexford Barnie
*Assistant Examiner*—Joseph Lauture
(74) *Attorney, Agent, or Firm*—Wenderoth, Lind & Ponack, L.L.P.

(57) ABSTRACT

An electronic apparatus reads a digital data stream including a video signal and/or an audio signal outputted from an external apparatus according to a transmission clock different from a clock for the data stream, and outputs the video signal and/or audio signal without causing any discontinuity. The electronic apparatus includes a sample rate converter that rate-converts a predetermined volume of the audio signal in synchronization with a constant sampling clock, and changes a number of samples to be outputted, based on a data volume of an audio signal outputted by the electronic apparatus and a data volume of an audio signal transmitted from the external apparatus or transmittable from the external apparatus to the electronic apparatus.

8 Claims, 6 Drawing Sheets

ELECTRONIC APPARATUS AND CONTROL METHOD THEREOF USING SAMPLE RATE CONVERTER

TECHNICAL FIELD

The present invention relates to an electronic apparatus and a method of controlling the same.

BACKGROUND ART

In recent years, versatile memory cards (IC cards) each including a nonvolatile memory device such as a flash-memory, have been widely used in the market. Further, there have been developed such a functional module card (IC card) having the same interface as that of a memory card, and including a memory device and other functions (for example, a radio communication function). On the other hand, terrestrial digital broadcasting is being started. For example, if a function of receiving terrestrial digital broadcasting is installed into a functional module card, and a host apparatus can attach the functional module card thereto, the host apparatus is very attractive to users.

A conventional card-type electronic tuner is disclosed in the Japanese patent laid-open publication No. 5-14133. In the conventional card-type electronic tuner, the whole electronic tuner circuit thereof is contained in a card-type case. The card-type electronic tuner is connected to a host apparatus via a connector of the host apparatus, and the card-type electronic tuner transmits a received video signal and a received audio signal to the host apparatus via a video signal output terminal and an audio signal output terminal thereof, respectively.

Generally speaking, a versatile IC card (for example, a functional module card such as an SD card or a memory stick) communicates with a host apparatus by use of a master-slave communication (in which the host apparatus generates a communication clock) in which the host apparatus operates as a master apparatus and the functional module card operates as a slave apparatus. In the master-slave communication, the host apparatus operating as the master apparatus determines a frequency of a transmission clock and a timing of data transmission. In addition, the versatile IC card does not have any communication pathways (for example, an exclusive line for transmitting video signals or audio signals) for communicating with the host apparatus, other than a pathway for communicating with the host apparatus by use of the master-slave communication.

On the other hand, an IC card having the function of receiving terrestrial digital broadcasting reproduces a clock generated by a broadcasting station from received data, processes the received data using the clock, and stores processed data (a broadcasting signal) in a built-in buffer RAM thereof. The host apparatus reads out the broadcasting signal received by the IC card, and then outputs the broadcasting signal using its own transmission clock.

As described above, the clock generated by the broadcasting station and a clock generated by the host apparatus are independent of each other. On the other hand, the digital broadcasting signal is continuous relative to a time axis. Accordingly, when there is even a slight difference between a clock according to which the broadcasting station outputs the broadcasting signal and a clock according to which the host apparatus processes and outputs the broadcasting signal, the difference accumulates in process of time, and this leads to such a problem that a continuity of the broadcasting signal outputted from the host apparatus cannot be maintained.

Concretely speaking, conventionally, when an attempt to provide the versatile IC card including the function of receiving terrestrial digital broadcasting is made, the following problem occurs. When the versatile IC card including the function of receiving terrestrial digital broadcasting is attached to the host apparatus, and the host apparatus reads out the broadcasting signal received by the IC card and outputs the broadcasting signal, the following problem arises. In case where a frequency of the clock according to which the broadcasting station outputs the broadcasting signal is slightly higher than a frequency of the clock according to which the host apparatus outputs the broadcasting signal (a video signal and an audio signal, or a video signal or an audio signal (this kind of combination is simply referred to as a video signal and/or an audio signal hereinafter)), data received by the IC card but not read out by the host apparatus accumulates. Then, if a volume of accumulated data exceeds the capacity of the buffer RAM, the accumulated data overflows from the buffer RAM. As a result, part of the broadcasting signal is discarded without being outputted from the host apparatus. In this case, skipping of the video signal and/or audio signal outputted from the host apparatus occurs.

In case where the frequency of the clock according to which the broadcasting station outputs the broadcasting signal is slightly lower than the frequency of the clock according to which the host apparatus outputs the broadcasting signal (the video signal and/or audio signal), data to be outputted from the host apparatus is exhausted eventually. In this case, a time period without any video signal and/or audio signal to be outputted from the host apparatus is generated (for example, blackout or freezing in the video signal and a silent period in the audio signal). In both cases described above, in a display and/or a speaker for outputting the video signal and/or audio signal outputted from the host apparatus, a problem of causing discontinuity, such as skipping of the video signal and/or audio signal and a period without any video signal and/or audio signal, occurs.

The present invention is directed to solve the above-mentioned problem, and an object of the present invention is therefore to provide an electronic apparatus and a method of controlling the same, for reading a digital data stream including a video signal and/or an audio signal outputted from an external apparatus according to a clock different from a clock for the data stream, and for outputting the video signal and/or audio signal substantially in synchronization with the clock for the data stream (for outputting the video signal and/or audio signal without causing any discontinuity relative to the time axis).

Another object of the present invention is to provide an electronic apparatus (a host apparatus for an IC card), capable of attaching thereto such an IC card having the function of receiving the digital broadcasting signal and being connected to the electronic apparatus via a versatile interface, capable of reading out the broadcasting signal received by the IC card, and capable of outputting the broadcasting signal without causing any discontinuity relative the time axis. In addition, a further object of the present invention is to provide a method of controlling the electronic apparatus.

DISCLOSURE OF INVENTION

In order to solve the above-described problems, the present invention has the following constitutions.

According to one aspect of the present invention, there is provided an electronic apparatus including a communication section for requesting an external apparatus to transmit a digital data stream including a video signal and/or an audio signal which are continuous relative to a time axis, and for receiving the digital data stream transmitted in response to the request, a sample rate converter for rate-converting a received video signal and/or audio signal, and an output section for outputting the video signal and/or audio signal which are rate-converted and demodulated into a continuous signal. The sample rate converter changes a number of samples to be outputted in the case that a predetermined volume of the video signal and/or audio signal is rate-converted according to a constant sampling clock and outputted, based on:

(a) time information and/or data volume of the video signal and/or audio signal processed or outputted by the electronic apparatus; and (b) time information and/or data volume of the video signal and/or audio signal, which are transmitted from the external apparatus or transmittable from the external apparatus to the electronic apparatus.

The present invention exhibits such an function of realizing an electronic apparatus and a method of controlling the same, for reading the digital data stream including the video signal and/or audio signal outputted from the external apparatus according to the clock different from the clock for the data stream, and for outputting the video signal and/or audio signal substantially in synchronization with the clock for the data stream (for outputting the video signal and/or audio signal without causing any discontinuity relative to the time axis).

In a typical case, there is calculated a difference between the time information and/or data volume of the video signal and/or audio signal processed or outputted by the electronic apparatus (for example, a host apparatus for the IC card) and the time information and/or data volume of the video signal and/or audio signal that are transmittable from the external apparatus (for example, the IC card) to the electronic apparatus, and the number of samples to be outputted is changed based on a change in the difference.

In a typical case, when a constant volume of the above-mentioned video signal and/or audio signal is rate-converted according to the constant sampling clock and outputted, the number of samples to be outputted is changed. Instead of this, the data volume of the video signal and/or audio signal to be rate-converted at a constant number of samples and outputted may be changed (these two cases are substantially identical to each other).

For example, assuming that the difference=(the data volume of the video signal and/or audio signal outputted from the electronic apparatus)−(the data volume of the video signal and/or audio signal that are transmittable from the external apparatus to the electronic apparatus), the following steps are executed. When the difference increases, the constant volume of the video signal and/or audio signal is rate-converted according to the constant sampling clock, so as to increase the number of samples to be outputted. When the difference decreases, the constant volume of the video signal and/or audio signal is rate-converted according to the constant sampling clock, so as to decrease the number of samples to be outputted.

In the above-mentioned electronic apparatus, the external apparatus preferably transmits an interrupt signal to the communication section each time when a data volume of the data stream transmittable from the external apparatus to the electronic apparatus reaches a constant volume. In addition, the sample rate converter preferably changes the number of samples to be outputted, based on a number of received interrupt signals and a data volume of the video signal and/or audio signal processed or outputted by the electronic apparatus.

For example, in the above-mentioned example, the electronic apparatus is provided with an up-down counter. One pulse is generated each time when the data volume of the video signal and/or audio signal outputted from the electronic apparatus reaches a constant volume (assumed to have the same value as a frequency division number (constant) according to which the external apparatus generates an interrupt signal), and the pulse is inputted to the up-down counter as an up-count clock. The interrupt signal generated by the external apparatus is inputted to the up-down counter as a down-count clock. A count value generated by the up-down counter or an averaged value of the count values is used as the number of samples to be outputted in the case that the constant volume of the video signal and/or audio signal is rate-converted and outputted. According to the present invention, the above-mentioned effect can be obtained by using a simple configuration.

In the above-mentioned electronic apparatus, the external apparatus is preferably a receiver apparatus for receiving the digital data stream transmitted from an external thereof, and the electronic apparatus preferably has a decoder section or a display section for the video signal and/or audio signal.

In the above-mentioned electronic apparatus, the external apparatus is preferably an IC card, and the electronic apparatus is preferably a host apparatus to which the IC card is attached.

From another aspect of view of the present invention, there is provided a method of controlling an electronic apparatus including a communication step of requesting an external apparatus to transmit a digital data stream including a video signal and/or an audio signal which are continuous relative to a time axis, and receiving the digital data stream transmitted in response to the request, a sample rate converting step of rate-converting a received video signal and/or audio signal, and an outputting step of outputting the video signal and/or audio signal which are rate-converted and demodulated into a continuous signal. The sample rate converting step changes a number of samples to be outputted in the case that a predetermined volume of the video signal and/or audio signal is rate-converted according to a constant sampling clock and outputted, based on:

(a) time information and/or data volume of the video signal and/or audio signal processed or outputted by the electronic apparatus; and (b) time information and/or data volume of the video signal and/or audio signal, which are transmitted from the external apparatus or transmittable from the external apparatus to the electronic apparatus.

In the above-mentioned method of controlling an electronic apparatus, the external apparatus transmits an interrupt signal to the communication section each time when a data volume of the data stream transmittable from the external apparatus to the electronic apparatus reaches a constant volume, and the sample rate converting step changes the number of samples to be outputted, based on a number of received interrupt signals and a data volume of the video signal and/or audio signal processed or outputted by the electronic apparatus.

The present invention exhibits such an advantageous effect of realizing an electronic apparatus and a method of controlling the same, for reading the digital data stream including the video signal and/or audio signal outputted from the external apparatus according to the clock different from the clock for the data stream, and for outputting the video signal and/or audio signal substantially in synchronization with the clock for the data stream (for outputting the video signal and/or audio signal without causing any discontinuity relative to the time axis).

The present invention exhibits such an advantageous effect of realizing an electronic apparatus (the host apparatus for the IC card), capable of attaching thereto such an IC card having the function of receiving the digital broadcasting signal and being connected to the electronic apparatus via a versatile interface, capable of reading out the broadcasting signal received by the IC card, and capable of outputting the broadcasting signal without causing any discontinuity relative the time axis. In addition, the present invention exhibits such an advantageous effect of realizing a method of controlling the electronic apparatus.

The novel features of the invention will be hereinafter fully described and particularly pointed out in the appended claims and the configuration and details of the invention, together with other objects and features thereof, will become better understood and appreciated by reference to the following detailed description when considered in conjunction with the accompanying drawings.

It will be understood that all or part of the drawings are purely diagrammatic for illustrative purposes and do not necessarily present faithful depictions of the actual relative sizes or positions of the illustrated elements.

BEST MODE FOR CARRYING OUT THE INVENTION

Preferred embodiments that specifically show best modes for carrying out the present invention will be described hereinafter with reference to the drawings.

First Preferred Embodiment

Figure 1:
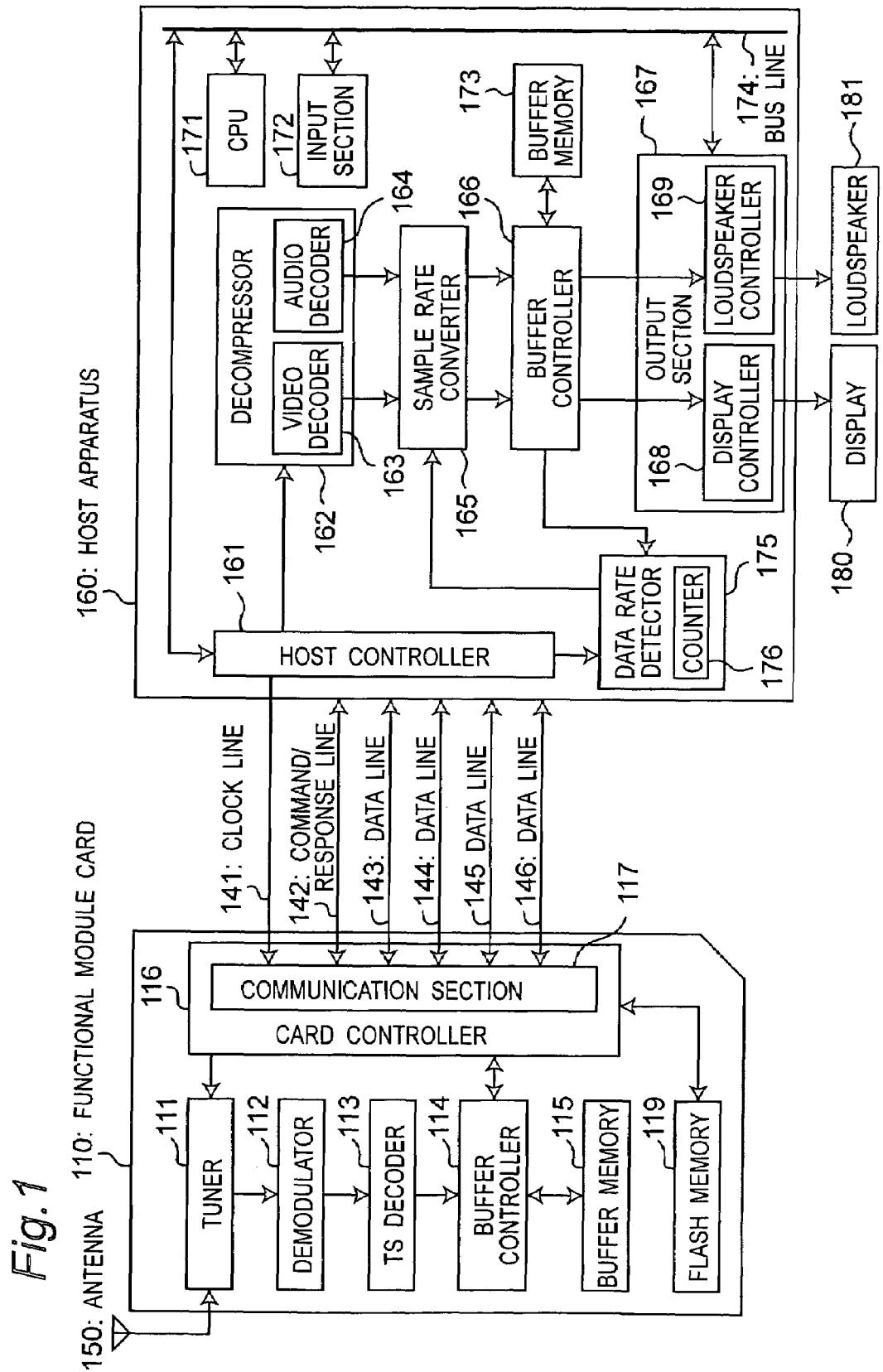
FIG. 1 is a block diagram showing a schematic configuration of a digital broadcasting receiver apparatus according to a first preferred embodiment of the present invention.
Figure 2:
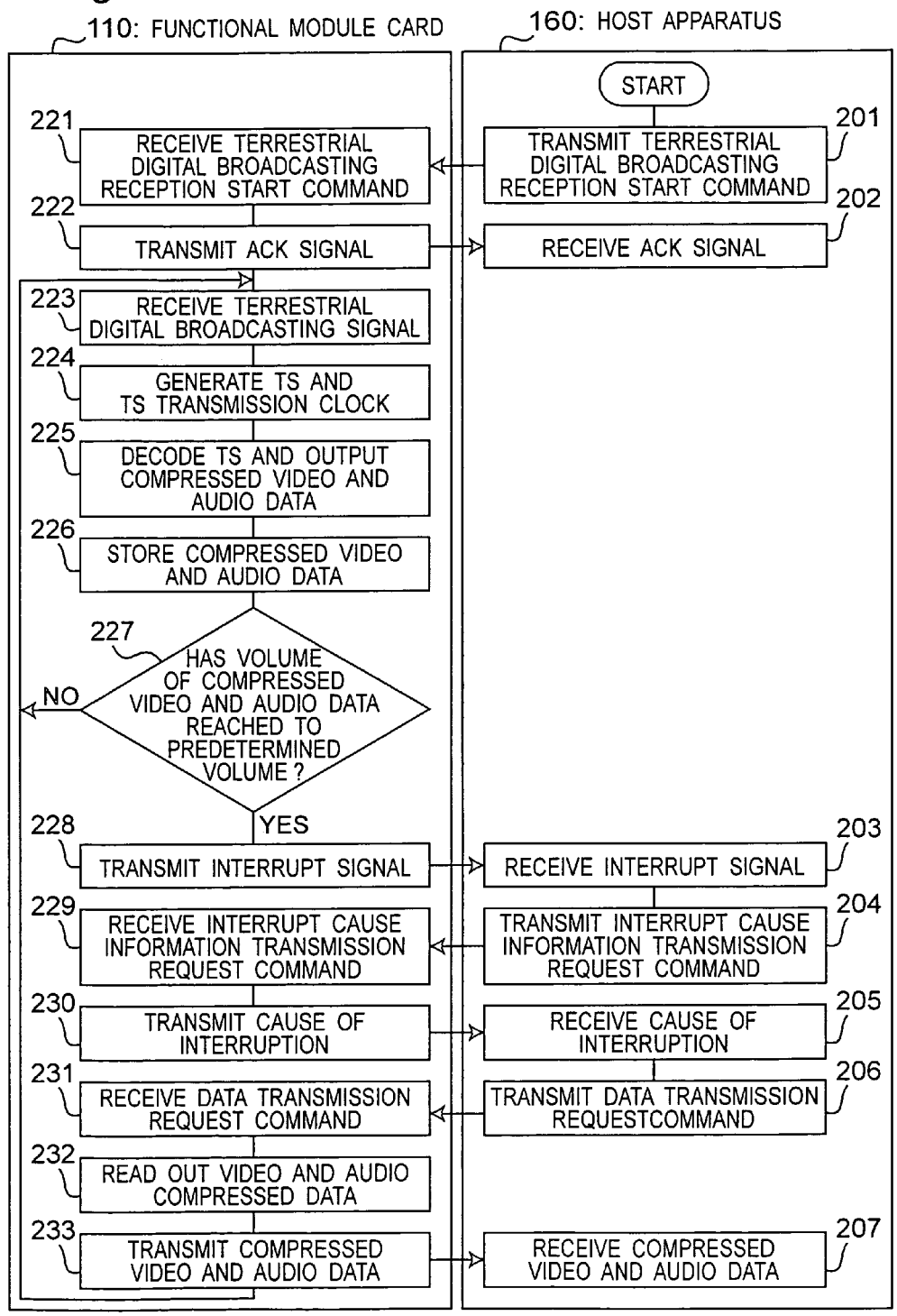
FIG. 2 is a flowchart showing a digital broadcasting receiving method according to the first preferred embodiment of the present invention.
Figure 3:
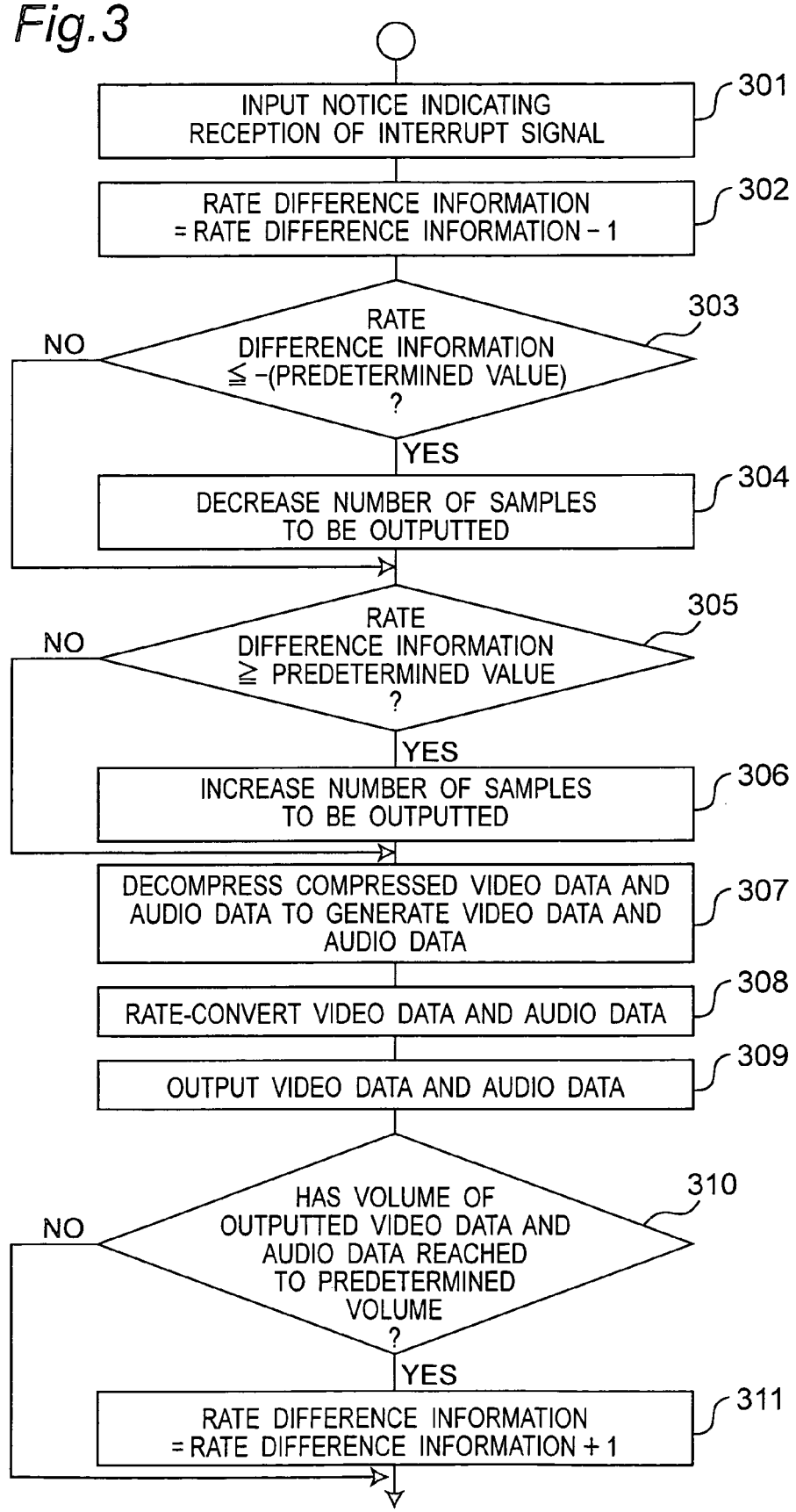
FIG. 3 is another flowchart showing the digital broadcasting receiving method according to the first preferred embodiment of the present invention.

Referring to FIGS. 1 to 3, a host apparatus (an electronic apparatus) for a functional module card (IC card) and a method of controlling the host apparatus according to the first preferred embodiment of the present invention will be described. FIG. 1 is a block diagram showing a configuration of a digital broadcasting receiver apparatus according to the first preferred embodiment of the present invention. Referring to FIG. 1, reference numeral 110 denotes the functional module card, and reference numeral 160 denotes the host apparatus.

In the first preferred embodiment of the present invention, the functional module card 110 is a tuner card (IC card) obtained by installing a function of receiving terrestrial digital broadcasting into a versatile memory card. The functional module card 110 may be an arbitrary versatile functional module card. For example, the arbitrary versatile functional module card (IC card) is an SD card or a memory stick. In the first preferred embodiment, the functional module card 110 is the SD card. The functional module card 110 includes an antenna 150, a tuner 111, a demodulator 112, a TS (transport stream) decoder 113, a buffer controller 114, a buffer memory 115, a card controller 116, and a flash memory 119. The card controller 116 includes a communication section 117.

In the first preferred embodiment of the present invention, the host apparatus 160 includes an insertion slot (not shown) to which the functional module card 110 is attached. A connector provided to the insertion slot of the host apparatus 160 is connected to a connector (not shown) of the functional module card 110 that is attached to the insertion slot. Via the connectors, the host apparatus 160 outputs electric power, control commands, data, and the like to the functional module card 110, and receives responses, video and audio signals of moving pictures, data, and the like outputted from the functional module card 110. In the first preferred embodiment, the host apparatus 160 is a PDA (Personal Digital Assistants). The functional module card 110 is inserted into the insertion slot for the card, and the host apparatus 160 outputs video data and audio data of terrestrial digital broadcasting received by the functional module card 110 to a display 180 and a loudspeaker 181. The display 180 and loudspeaker 181 may be built in the host apparatus 160.

Alternatively, the host apparatus 160 may be the other apparatus (such as a notebook type personal computer or a mobile telephone). The host apparatus 160 enables any one of not only the functional module card 110 but also various kinds of other functional module cards (such as a functional module card including only a memory function and a functional module card including the memory function and the other function (e.g., a radio communication function)) to be attached to the insertion slot (including the connector provided to the insertion slot) and to operate.

The host apparatus 160 includes a host controller 161, a decompressor 162, a sample rate converter 165, a buffer controller 166, an output section 167, a data rate detector 175, a buffer memory 173, a CPU 171, an input section 172, and a bus line 174. The data rate detector 175 includes a counter 176. The decompressor 162 includes a video decoder 163 and an audio decoder 164. The output section 167 includes a display controller 168 and a loudspeaker controller 169. The host controller 161, the CPU 171, the input section 172, and the output section 167 are connected to each other via the bus line 174.

The host apparatus 160 and the functional module card 110 are connected to each other via a clock line 141, a command/response line 142 and data lines 143, 144, 145 and 146. The clock line 141, the command/response line 142 and the data lines 143, 144, 145 and 146 serve as a bus for executing communication between the communication section 117 and the host controller 161.

Further, a power source line for supplying the electric power from the host apparatus 160 to the functional module card 110 and a ground line are included in connection lines (not shown) for connecting the functional module card 110 to the host apparatus 160. The functional module card 110 operates when the electric power is supplied to the functional module card 110 from the host apparatus 160.

A master-slave communication, in which the host apparatus 160 operates as a master apparatus and the functional module card 110 operates a slave apparatus, is held between the host apparatus 160 and the functional module card 110. The host apparatus 160 transmits commands to the functional module card 110 via the command/response line. 142, and transmits data to the functional module card 110 via the command/response line 142 or the data lines 143 to 146. For example, the host apparatus 160 transmits a command, such as a command for setting a receiving channel of the tuner 111, to the functional module card 110. The host apparatus 160 transmits a clock (referred to as a "transmission clock" hereinafter) to the functional module card 110 via the clock line 141, when transmitting the commands or data and when receiving the responses or data. The transmission clock is generated based on an outputted signal from an oscillator (not shown) built in the host apparatus 160.

To the host apparatus 160, the functional module card 110 transmits a response to a command from the host apparatus 160 via the command/response line 142. The functional module card 110 transmits data to the host apparatus 160 via the command/response line 142 or the data lines 143 to 146. Via one of the data lines 143 to 146, the functional module card 110 transmits an interrupt signal to the host apparatus 160 within a time period in which no data is transmitted. For example, the functional module card 110 transmits compressed data of a received digital signal stream, the interrupt signal and data stored in the flash memory 119 to the host apparatus 160. The above-mentioned interrupt signal, responses and data are outputted in synchronization with the transmission clock transmitted from the host apparatus 160 via the clock line 141.

Next, functions and operations of the respective blocks of the functional module card 110 will be described.

The antenna 150 receives a terrestrial digital broadcasting signal (a digital data stream) which is transmitted from a broadcasting station and includes compressed video data and compressed audio data.

The tuner 111 extracts a broadcasting signal (one broadcasting signal at a specific frequency extracted from among multiplexed broadcasting signals) of a specific channel designated by the host apparatus 160 from among frequencies of all channels received by the antenna 150. The demodulator 112 demodulates a terrestrial digital broadcasting signal received by the tuner 111 into a baseband signal, generates a transport stream (referred to as a "TS" hereinafter) of the baseband signal and a TS transmission clock (extracted from the baseband signal and synchronized with a clock according to which the broadcasting station outputs the broadcasting signal), and outputs the TS and the TS transmission clock to the TS decoder 113.

The TS decoder 113 generates a system time clock (synchronized with a clock according to which the broadcasting station transmits compressed video and audio data) based on the TS transmission clock and time information included in the TS, and decodes the TS using the system time clock. The terrestrial digital broadcasting signal transmitted from the broadcasting station includes effective packets and ineffective packets. Accordingly, the TS decoder 113 eliminates the ineffective packets so as to generate the compressed video and audio data. Each of video data and audio data included in the terrestrial digital broadcasting signal is compressed, error-correction coded and shuffled (or scrambled). The TS decoder 113 deshuffles (or descrambles) and error-correction decodes received compressed video data and compressed audio data. The TS decoder 113 transmits generated compressed video and audio data to the buffer controller 114. In the first preferred embodiment, the digital signal stream received by the functional module card 110 conforms to the MPEG2-TS format, and a value of the system time clock generated by the TS decoder 113 is 27 MHz. In the first preferred embodiment, a compression ratio of the compressed video and audio data generated by the TS decoder 113 (a ratio of an amount of information of compressed data to an amount of information of uncompressed data) is fixed to a predetermined value of "C".

In the first preferred embodiment, for the sake of simplicity of description, it is assumed that a compression ratio of the compressed video data and a compression ratio of the compressed audio data are the same. In addition, it is assumed that there is a predetermined relationship between a clock of the compressed video data transmitted from the broadcasting station and a clock of the compressed audio data transmitted from the broadcasting station. For example, it is assumed that the clock of the compressed video data and the clock of the compressed audio data are generated by dividing a frequency of one reference clock at different frequency division ratios, respectively. In a manner similar to the clock of the compressed video data transmitted from the broadcasting station and the clock of the compressed audio data transmitted from the broadcasting station, the host apparatus 160 uses clocks generated by dividing a frequency of one reference clock at different frequency division ratios as a clock for the video data and a clock for the audio data. The host apparatus 160 monitors a change in a difference between a data volume received by the functional module card 110 and a data volume outputted from the host apparatus 160, for the video data, the audio data or combination data of the video data and the audio data (the two data volumes are normalized so that an inputted data volume and an outputted data volume have the same value in a balanced state). The sample rate converter 165 of the host apparatus 160 rate-converts predetermined volumes of a video signal and an audio signal based on the change in the difference, so as to change a number of samples of the video signal and audio signal to be outputted (a sampling clock for outputting them is not changed).

The buffer controller 114 stores the compressed video and audio data in the buffer memory 115. The buffer controller 114 memorizes a stored data volume of the compressed video and audio data stored in the buffer memory 115. Each time when data volume of the compressed video and audio data newly stored to the buffer memory 115 reaches a predetermined value "R" ("R" is an arbitrary positive integer), the buffer controller 114 transmits information that the data volume of the compressed video and audio data newly stored to the buffer memory 115 has reached the predetermined value, to the card controller 116. Upon receiving the information, the card controller 116 transmits the interrupt signal (the interrupt signal requesting the host apparatus 160 to read out the compressed video and audio data) to the host apparatus 160. Upon receiving the interrupt signal, the host apparatus 160 transmits a compressed video and audio data reading out request command to the card controller 116. The buffer controller 114 reads out the compressed video and audio data from the buffer memory 115 in response to the compressed video and audio data reading out request command, and transmits read-out data to the host apparatus 160 via the card controller 116.

The communication section 117 receives the commands and the data, and transmits the responses to the commands and the data in synchronization with the transmission clock transmitted from the host controller 161 via the clock line 141. In addition, the communication section 117 transmits the interrupt signal to the host controller 161 in a manner that is the same as described above. When the interrupt signal is transmitted, no clock is outputted from the host apparatus 160. Upon receiving the compressed video and audio data reading out request command from the host controller 161, the card controller 116 transfers the request command to the buffer controller 114. After receiving the compressed video and audio data from the buffer controller 114, the card controller 116 transmits received data from the communication section 117 to the host apparatus 160 via the data lines 143 to 146.

The flash memory 119 is a nonvolatile memory section identical to that used in a conventional memory card. The flash memory 119 stores data and the like transmitted from the host apparatus 160.

Next, each block of the host apparatus 160 will be described. To the input section 172, the user inputs a terrestrial digital broadcasting reception start command, a value of a channel to be received, a sound volume of audio data to be outputted to the loudspeaker, and the like.

The CPU 171 controls internal operations (that includes an operation of the host apparatus 160 as the PDA and operations for controlling the decompressor 162, and the like) of the host apparatus 160. In addition, the CPU 171 transmits a command to perform each operation to the functional module card 110, and controls the communication between the host controller 161 and the communication section 117.

The host controller 161 executes the master-slave communication, in which the host apparatus 160 operates as the master apparatus and the functional module card 110 operates the slave apparatus, between the host controller 161 and the communication section 117. When transmitting the commands or the data and when receiving the responses or the data, the host controller 161 transmits the transmission clock to the functional module card 110 via the clock line 141. The host controller 161 receives the compressed video and audio data transmitted from the communication section 117 via the data lines 143 to 146. In addition, the host controller 161 transmits a notice indicating a reception of the interrupt signal (the interrupt signal, the cause of the interruption of which is based on the fact that the functional module card 110 has received a constant volume "R" of the compressed video and audio data) to the data rate detector 175. Further, the host controller 161 transmits the compressed video and audio data to the decompressor 162.

The counter 176 of the data rate detector 175 detects rate difference information, which is a difference between a data rate of the video signal and audio signal (the broadcasting signal) received by the functional module card 110 and a data rate of the video signal and audio signal outputted from the host apparatus 160 (the two data rates are normalized). Upon receiving the notice indicating the reception of the interrupt signal from the host controller 161, the data rate detector 175 subtracts one from the rate difference information. Each time when data volume of outputted video data and audio data reaches a predetermined value (R×C) ("R" denotes a frequency division ratio at which the functional module card 110 frequency-divides an amount of information of the compressed video and audio data and outputs the interrupt signal, and "C" denotes the compression ratio of the compressed video and audio data), the buffer controller 166 transmits output information about its own output to the data rate detector 175. Upon receiving the output information from the buffer controller 166, the data rate detector 175 adds one to the rate difference information.

An initial value of the rate difference information is "0". When a total of the data volume of outputted video data and audio data is larger than a total of the data volume of the video data and audio data received by the functional module card 110, the rate difference information has a positive value. When the total of the data volume of outputted video data and audio data is smaller than the total of the data volume of the video data and audio data received by the functional module card 110, the rate difference information has a negative value. The data rate detector 175 transmits the rate difference information to the sample rate converter 165.

Based on the rate difference information, the sample rate converter 165 determines the number of samples to be outputted in the case that a constant volume of the video data (or the audio data) is outputted according to a constant sampling clock. In this preferred embodiment, when the rate difference information deviates from a constant limit width, the sample rate converter 165 changes the number of samples to be outputted. When such a state that the rate difference information deviates from the constant limit width continues, the sample rate converter 165 renews the number of samples to be outputted, at every predetermined time, so that the rate difference information becomes close to a proper value.

When the functional module card 110 starts receiving the compressed video and audio data (the broadcasting signal) on a channel designated by the host apparatus 160, the host apparatus 160 preferably obtains information about a data rate of the compressed video and audio data on the channel from the functional module card 110. For example, a sequence layer of a data stream of an MPEG2 video signal includes information about the data rate. The sample rate converter 165 sets an initial value of the number of samples to be outputted in the case that the constant volume of the video data (and the audio data) is outputted, so that an effective data rate (a data rate obtained by conversion on the assumption that the compressed data are decompressed) of the compressed video data (and the compressed audio data) (the broadcasting signal) received by the functional module card 110 becomes identical to the data rate of the video signal (and the audio signal) outputted from the host apparatus 160 (in order to promptly stabilize the number of samples to be outputted). The data rate detector 175 transmits the rate difference information to the sample rate converter 165.

The decompressor 162 includes the video decoder 163 and the audio decoder 164, and decompresses the compressed video and audio data according to a built-in clock of the host apparatus 160. A frequency of the clock according to which the decompressor 162 decompresses the compressed video and audio data is set to a value so that the effective data rate (the data rate obtained by conversion on the assumption that the compressed data are decompressed) of the compressed video data and compressed audio data (the broadcasting signal) received by the functional module card 110 becomes almost identical to the data rate of the video signal and audio signal outputted from the host apparatus 160. The video decoder 163 decompresses the video data compressed according to the MPEG2 or MPEG4 system or the like. The audio decoder 164 decompresses the audio data compressed according to the AAC or MP3 system or the like. The decompressor 162 transmits decompressed video data and audio data to the sample rate converter 165.

The transmission of the compressed video and audio data from the functional module card 110 to the host apparatus 160 and the decompression of the compressed video and audio data at the decompressor 162 are carried out according to the built-in clock of the host apparatus 160. In other words, the decompression of the compressed video and audio data is carried out according to a clock different from and not synchronized with the system time clock generated from the digital broadcasting signal. Accordingly, if the video data and audio data decompressed by the decompressor 162 are directly outputted to the display 180 and loudspeaker 181 via the output section 167, a total of a data volume of outputted video data and audio data eventually exceeds and becomes different from a total of the effective data volume of the compressed video and audio data to be received by the functional module card 110 (the difference between the two totals of the data volumes deviates from a predetermined limit). This leads to an occurrence of a state where a time period is generated in which there is no video signal or audio signal to be reproduced by the display 180 or loudspeaker 181 (for example, blackout or freezing of the video signal, or a silent period in the audio signal), or a state where the video signal or the audio signal stored in the buffer memory 115 of the functional module card 110 overflows and a part thereof is discarded without being outputted (skipping in the video signal or the audio signal).

Based on the rate difference information outputted from the data rate detector 175, the sample rate converter 165 determines the number of samples to be outputted in the case that the constant volume of the video data (and the audio data) is outputted according to the constant sampling clock. Then, the sample rate converter 165 rate-converts every constant volume of the decompressed video data and audio data so as to output rate-converted video data and audio data having determined number of samples to the buffer controller 166, respectively. When the value of the rate difference information from the data rate detector 175 increases, the sample rate converter 165 rate-converts the constant volume of the video data and audio data based on an amount of the increase, so as to increase the number of samples to be outputted. For example, the sample rate converter 165 inputs audio data of 1024 samples, and changes the number of samples of the audio data to be outputted from a former value of 2048 samples to 2049 samples. When the value of the rate difference information from the data rate detector 175 decreases, the sample rate converter 165 rate-converts the constant volume of the video data and audio data based on an amount of the decrease, so as to decrease the number of samples to be outputted. For example, the sample rate converter 165 inputs the audio data of 1024 samples, and changes the number of samples of the audio data to be outputted from the former value of 2048 samples to 2047 samples.

The sample rate converter 165 generates new samples by calculation (for example, interpolation) using preceding and subsequent samples thereof.

In a typical case, in the sample rate converter 165, each of an input sampling clock and an output sampling clock has a constant frequency. For example, the output sampling clock may be a clock having a frequency "n" times ("n" is a positive integer of 1 or large) that of the input sampling clock. In order to prevent generation of aliasing (false information owing to folding components), for example, a double-sampling method may be used by setting "n" to 2.

The buffer controller 166 stores the rate-converted video data and audio data in the buffer memory 173, respectively, reads out them according to a constant clock, and outputs them as signals having continuities relative to the time axis. As described above, each time when the data volume of the outputted video data and audio data reaches the predetermined value (R×C), the buffer controller 166 transmits information about its own output to the data rate detector 175. The output section 167 receives the video data and audio data, and outputs them as a digital or an analog signal. The display controller 168 outputs the video data to the display 180. The loudspeaker controller 169 outputs the audio data to the loudspeaker 181.

According to the configuration of the first preferred embodiment, the constant volume of video data and audio data is rate-converted, and rate-converted video data and audio data are outputted according to the constant sampling clock, with the number of samples to be outputted is automatically controlled so that the effective data rate (the data rate obtained by conversion on the assumption that the compressed data has been decompressed) of the video signal and audio signal (the broadcasting signal) received by the functional module card 110 becomes almost identical to the data rate of the video signal and audio signal outputted from the host apparatus 160.

Referring to FIGS. 2 and 3, a digital broadcasting receiving method (including the method of controlling the host apparatus) according to the first preferred embodiment of the present invention will be described. FIGS. 2 and 3 are flowcharts showing the digital broadcasting receiving method according to the first preferred embodiment of the present invention. FIG. 2 is a flowchart showing a processing method including processings that are executed by the time when the video signal and audio signal (the broadcasting signal) received by the functional module card 110 are transmitted to the host apparatus 160. The user inputs the terrestrial digital broadcasting reception start command to the input section 172. The host controller 161 receives the terrestrial digital broadcasting reception start command from the input section 172 via the bus line 174. The host controller 161 transmits the terrestrial digital broadcasting reception start command to the communication section 117 of the functional module card 110 via the command/response line 142 (step 201). The communication section 117 receives the terrestrial digital broadcasting reception start command (step 221), and transmits an ACK signal to the host controller 161 via the command/response line 142 (step 222). The host apparatus 160 receives the ACK signal (step 202).

In step 223, the card controller 116 activates the tuner 111. The tuner 111 receives a terrestrial digital broadcasting signal on a designated channel from the antenna 150, and inputs the terrestrial digital broadcasting signal to the demodulator 112. In step 224, the demodulator 112 demodulates the terrestrial digital broadcasting signal received by the tuner 111 into a baseband signal, generates the TS and the TS transmission clock (extracted from a demodulated terrestrial digital broadcasting signal), and outputs them to the TS decoder 113. In step 225, the TS decoder 113 generates the system time clock (synchronized with the clock according to which the broadcasting station transmits the broadcasting signal) based on the TS transmission clock and the time information included in the TS, decodes the TS using the system time clock, and generates the compressed video and audio data. Further, the TS decoder 113 transmits the compressed video and audio data to the buffer controller 114. The buffer controller 114 stores the compressed video and audio data in the buffer memory 115, and memorizes a volume of data stored in the buffer memory 115 (step 226). The buffer controller 114 judges whether or not the volume of the compressed video and audio data newly stored in the buffer memory 115 has reached a predetermined volume (step 227). When the volume of the compressed video and audio data in the buffer memory 115 has not reached the predetermined volume, the control flow goes back from step 227 to step 223. When the volume of the compressed video and audio data in the buffer memory 115 has reached the predetermined volume, the control flow goes from step 227 to step 228.

In step 228, the card controller 116 transmits the interrupt signal to the host controller 161 via one of the data lines 143 to 146. The host controller 161 receives the interrupt signal (step 203). The host controller 161 transmits an interrupt cause information transmission request command to the communication section 117 via the command/response line 142 (step 204). The communication section 117 receives the interrupt cause information transmission request command (step 229). To the host controller 161, via the command/response line 142, the communication section 117 transmits information indicating that the cause of the interruption is based on the fact that the volume of the compressed video and audio data newly stored in the buffer memory 115 has reached the predetermined volume (step 230). The host controller 161 receives interrupt cause information (step 205). The host controller 161 transmits a notice indicating the reception of the interrupt signal to the data rate detector 175.

Via the command/response line 142, the host controller 161 transmits a data transmission request command for requesting the transmission of the compressed video and audio data newly stored in the buffer memory 115 to the communication section 117 (step 206). The card controller 116 receives the data transmission request command for requesting the transmission of the compressed video and audio data (step 231). The card controller 116 reads out the compressed video and audio data from the buffer memory 115 via the buffer controller 114 (step 232). The communication section 117 transmits the compressed video and audio data to the host controller 161 via at least one line (preferably four lines) of the data lines 143 to 146 (step 233). The host controller 161 receives the compressed video and audio data (step 207), and transmits the compressed video and audio data to the decompressor 162.

FIG. 3 is a flowchart showing a method of how the host apparatus 160 processes the video signal and audio signal (the broadcasting signal) transmitted from the functional module card 110. Referring to FIG. 3, the data rate detector 175 receives the notice indicating the reception of the interrupt signal (the cause of the interruption of which is based on the fact that the functional module card 110 has received the constant volume "R" of the compressed video and audio data) from the host controller 161 (step 301). The data rate detector 175 subtracts one from the rate difference information (step 302). The data rate detector 175 transmits the rate difference information to the sample rate converter 165.

The sample rate converter 165 judges whether or not the rate difference information has become a value not more than a predetermined negative value (step 303). When the rate difference information has become the value not more than the predetermined negative value, the sample rate converter 165 decreases the number of samples to be outputted in the case that the constant volume of the video signal and audio signal is rate-converted and outputted, by a constant volume (step 304). When the rate difference information is larger than the predetermined negative value, the control flow goes to step 305. When such a state that the rate difference information has the value not more than the predetermined negative value continues in step 303, the sample rate converter 165 decreases the number of samples to be outputted in the case that the constant volume of the video signal and audio signal is rate-converted and outputted, by the constant volume at every predetermined time (step 304).

The sample rate converter 165 judges whether or not the rate difference information has become a value not less than a predetermined positive value (step 305). When the rate difference information has become the value not less than the predetermined positive value, the sample rate converter 165 increases the number of samples to be outputted in the case that the constant volume of the video signal and audio signal is rate-converted and outputted, by the constant volume (step 306). When the rate difference information is smaller than the predetermined positive value, the control flow goes to step 307. When such a state that the rate difference information has the value not less than the predetermined positive value continues in step 305, the sample rate converter 165 increases the number of samples to be outputted in the case that the constant volume of the video signal and audio signal is rate-converted and outputted, by the constant volume at every predetermined time (step 306).

In step 307, the video decoder 163 of the decompressor 162 decompresses the video data compressed according to the MPEG2 or MPEG4 system or the like to generate video data. The audio decoder 164 of the decompressor 162 decompresses the audio data compressed according to the AAC or MP3 system or the like to generate audio data. The decompressor 162 transmits decompressed video data and audio data to the sample rate converter 165.

The sample rate converter 165 rate-converts received video data and audio data so that number of samples of resultant video data and audio data becomes the above-mentioned number of samples to be outputted, and transmits the resultant video data and audio data to the buffer controller 166 (step 308). The buffer controller 166 stores the video data and audio data in the buffer memory 115, and thereafter outputs them. The buffer controller 166 memorizes the data volume of data stored in the buffer memory 173 or the data volume of data read out and outputted from the buffer memory 173 (step 309). The buffer controller 166 judges whether or not the data volume of the video data and audio data stored in the buffer memory 173 (or the data volume of the video data and audio data read out and outputted from the buffer memory 173) has reached a predetermined volume (step 310). When the data volume of the video data and audio data has reached the predetermined volume, the buffer controller 166 adds one to the rate difference information (step 311). The processing ends, when the data volume of the video data and audio data has not reached the predetermined volume.

According to the first preferred embodiment of the present invention, by installing the digital broadcasting receiving function into the versatile functional module card and by adding the data rate detector 175 and the sample rate converter 165 to a conventional host apparatus having a decompressor, the functional module card can receive the terrestrial digital broadcasting signal, and the host apparatus 160 can reproduce received terrestrial digital broadcasting signal so that discontinuity (for example, black out, freezing or skipping in video or audio) does not occur.

The host apparatus 160 can carry out the functions of not only the functional module card 110 according to the first preferred embodiment but also the functions (for example, the data storing function of the flash memory 119) of a conventional functional module card connected thereto and having no digital broadcasting receiving function.

Second Preferred Embodiment

Figure 4:
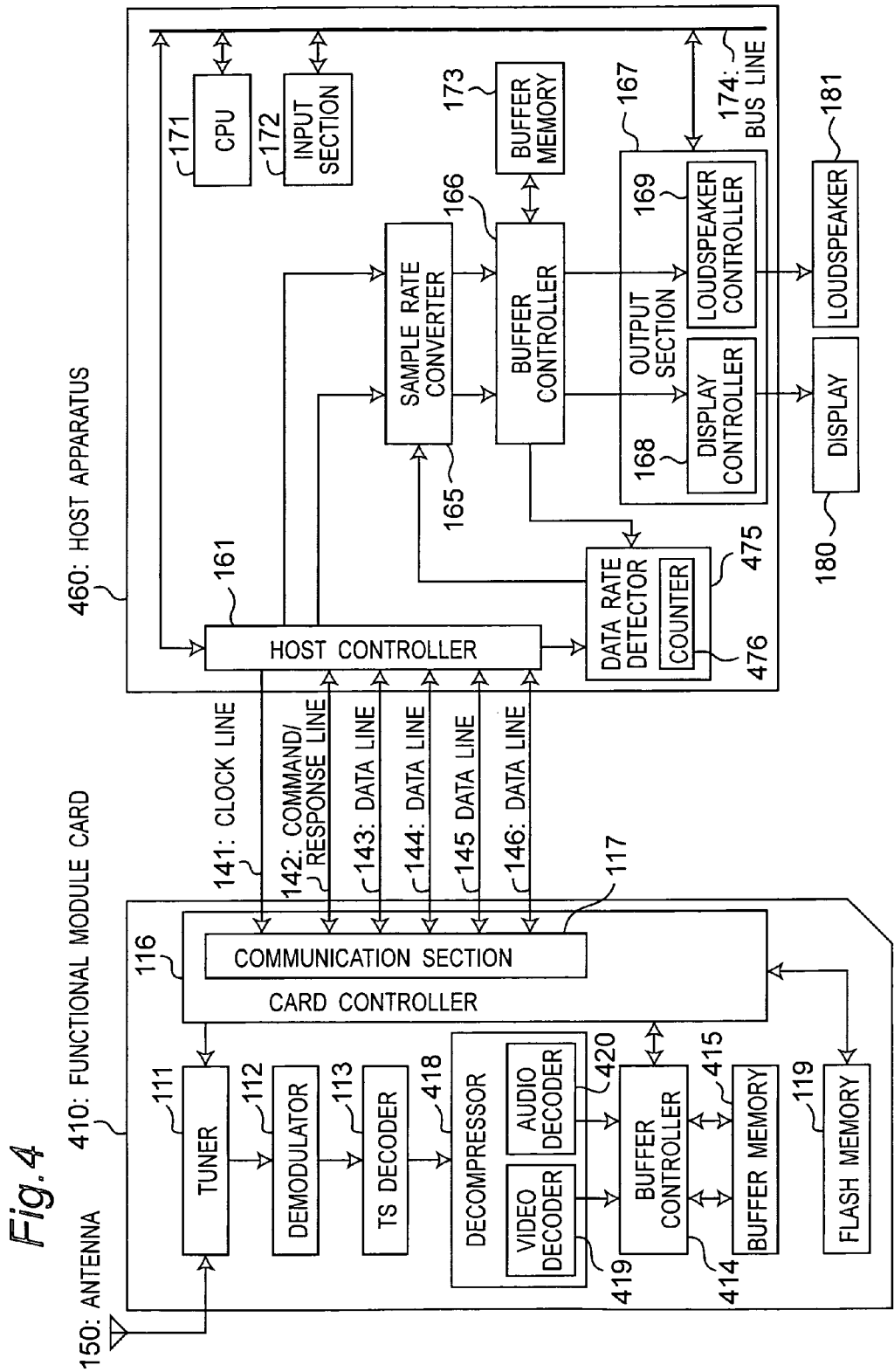
FIG. 4 is a is a block diagram showing a schematic configuration of a digital broadcasting receiver apparatus according to a second preferred embodiment of the present invention.
Figure 5:
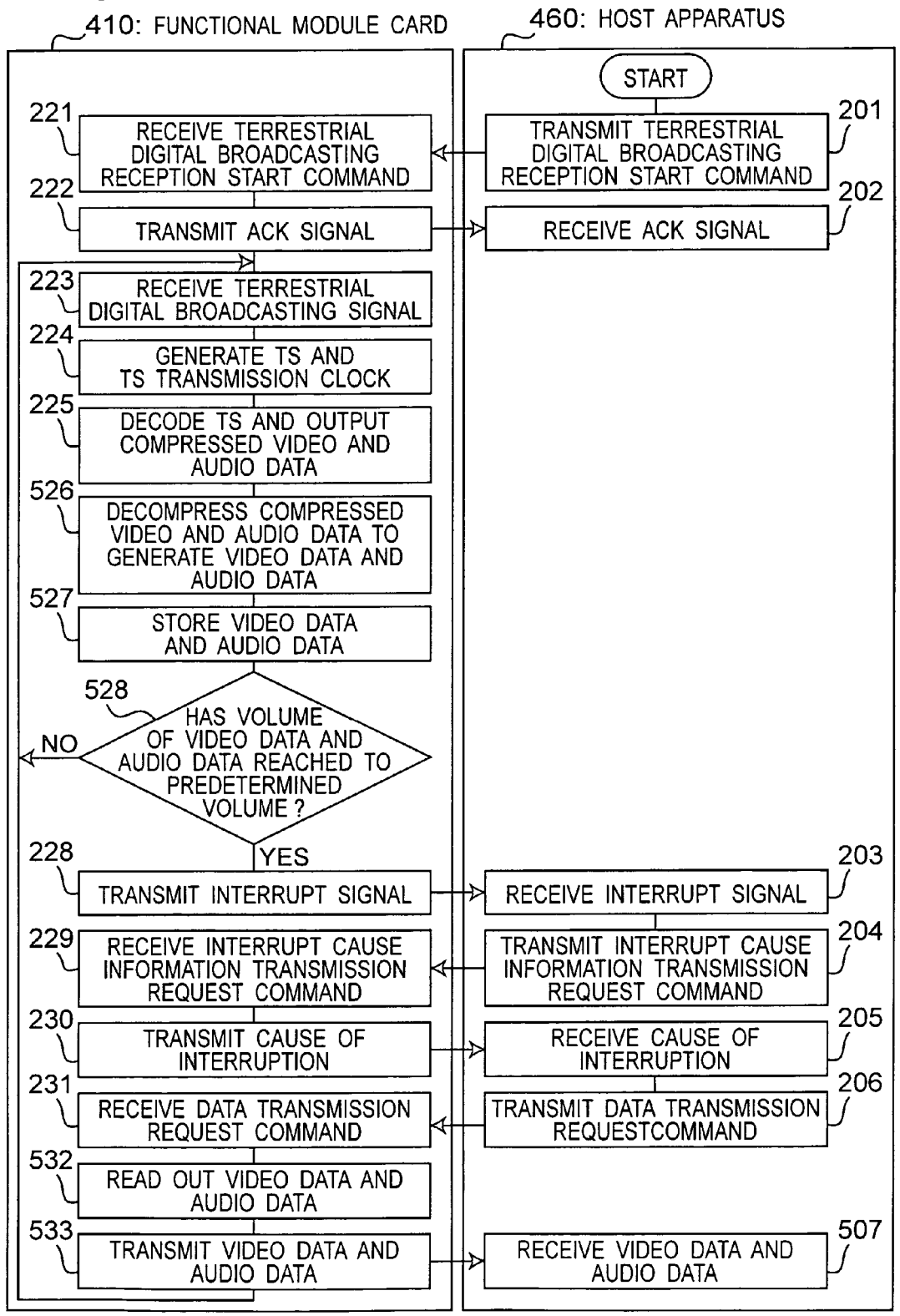
FIG. 5 is a flowchart showing a digital broadcasting receiving method according to the second preferred embodiment of the present invention.
Figure 6:
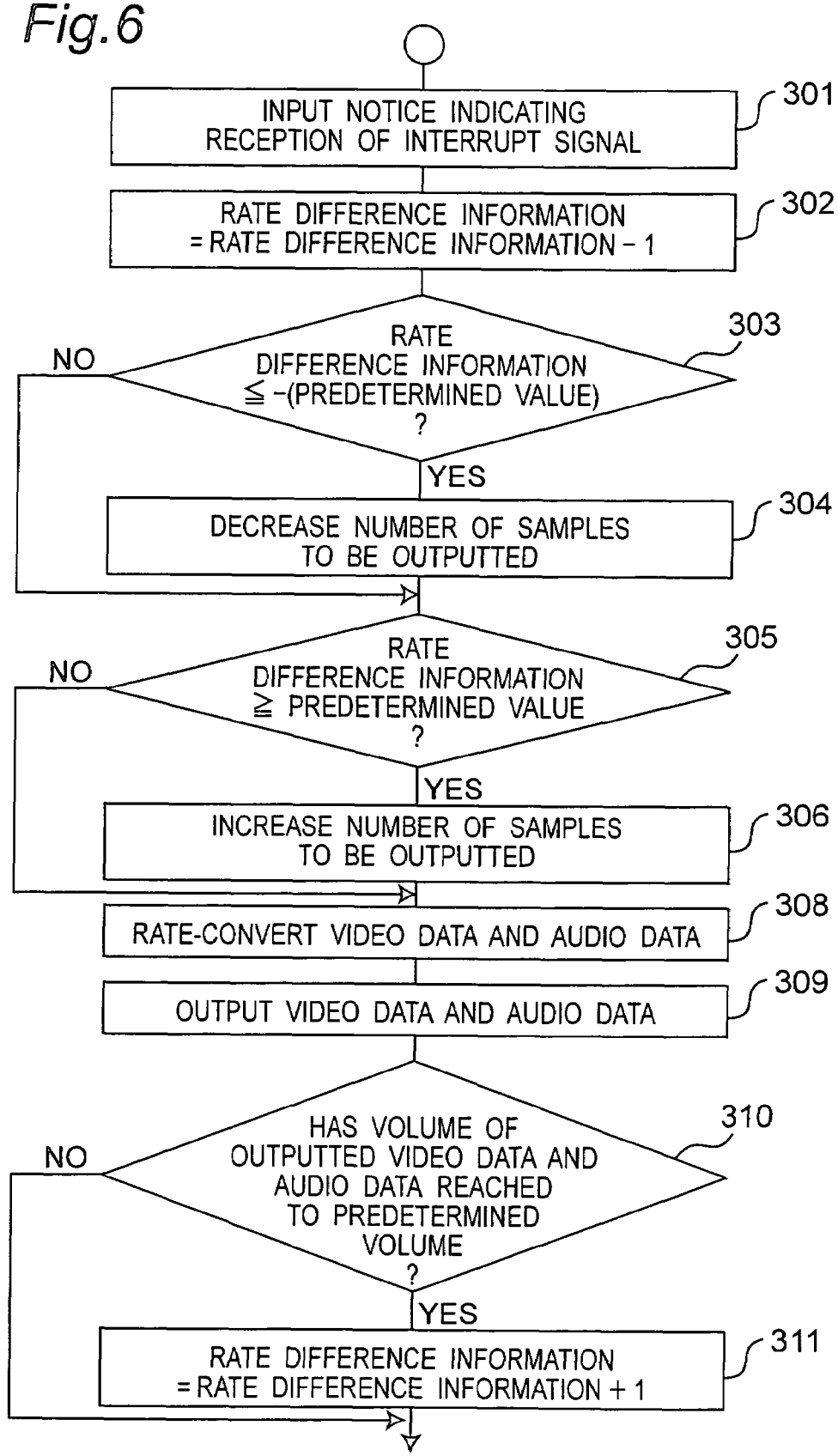
FIG. 6 is another flowchart showing the digital broadcasting receiving method according to the second preferred embodiment of the present invention.

Referring to FIGS. 4 to 6, a host apparatus for a functional module card, a method of controlling the host apparatus and a digital broadcasting receiver apparatus according to the second preferred embodiment of the present invention will be described. FIG. 4 is a block diagram showing a configuration of the digital broadcasting receiver apparatus according to the second preferred embodiment of the present invention. Referring to FIG. 4, reference numeral 410 denotes the functional module card, and reference numeral 460 denotes the host apparatus. The functional module card 410 according to the second preferred embodiment has such a configuration that a decompressor 418 is added to the functional module card 110 (FIG. 1) according to the first preferred embodiment, and the buffer controller 114 and the buffer memory 115 of the functional module card 110 are replaced with a buffer controller 414 and a buffer memory 415, respectively. The decompressor 418 includes a video decoder 419 and an audio decoder 420. The host apparatus 460 according to the second preferred embodiment has such a configuration that the decompressor 162 of the host apparatus 160 (FIG. 1) according to the first preferred embodiment is eliminated, and the data rate detector 175 of the host apparatus 160 is replaced with a data rate detector 475. The data rate detector 475 includes a counter 476. The other reference numerals are the same as those in the first preferred embodiment, and components as used commonly to digital broadcasting receiver apparatus shown in FIGS. 1 and 4 are denoted by the same reference numerals, respectively, and they will not be described.

The TS decoder 113 transmits generated compressed video and audio data to the decompressor 418. The decompressor 418 decompresses the compressed video and audio data according to the system time clock (synchronization with the clock according to which the broadcasting station outputs the broadcasting signal). The video decoder 419 decompresses the video data compressed according to the MPEG2 or MPEG4 system or the like. The audio decoder 420 decompresses the audio data compressed according to the AAC or MP3 system or the like. The decompressor 418 transmits decompressed video data and audio data to the buffer controller 414.

The buffer controller 414 stores the video data and audio data in the buffer memory 415. The buffer controller 414 memorizes a stored data volume of the video data and audio data stored in the buffer memory 415. Each time when data volume of the video data and audio data newly stored to the buffer memory 415 reaches a predetermined value "Re"' ("R"' is an arbitrary positive integer), the buffer controller 415 transmits information that the data volume of the video and audio data newly stored to the buffer memory 415 has reached the predetermined value, to the card controller 116. Upon receiving the information, the card controller 116 transmits an interrupt signal (an interrupt signal requesting the host apparatus 460 to read out the video data and audio data) to the host apparatus 460. Upon receiving the interrupt signal, the host apparatus 460 transmits a video data and audio data reading out request command to the card controller 116. The buffer controller 414 reads out the video data audio data from the buffer memory 415 in response to the video data and audio data reading out request command, and transmits read-out video data and audio data to the host apparatus 460 via the card controller 116.

The host controller 161 receives the video data and audio data transmitted from the communication section 117 via the data lines 143 to 146. In addition, the host controller 161 transmits a notice indicating the reception of the interrupt signal (the interrupt signal, the cause of the interruption of which is based on the fact that the functional module card 410 has received the constant volume "R"' of the video data and audio data) to the data rate detector 475. Further, the host controller 161 transmits the video data and audio data to the sample rate converter 165.

The counter 476 of the data rate detector 475 memorizes rate difference information, which is a difference between a data rate of the video signal and audio signal (the broadcasting signal) received by the functional module card 410 and a data rate of the video signal and audio signal outputted from the host apparatus 460. Upon receiving the notice indicating the reception of the interrupt signal from the host controller 161, the data rate detector 475 adds one to the rate difference information. Upon receiving a notice indicating output of the video data and audio data from the buffer controller 166, the data rate detector 475 subtracts one from the rate difference information. Each time when data volume of outputted video data and audio data reaches a predetermined value "R"' ("R"' denotes a frequency division ratio at which the functional module card 410 frequency-divides an amount of information of the video data and audio data and outputs the interrupt signal), an output information is transmitted to the data rate detector 475. Upon receiving the output information from the buffer controller 166, the data rate detector 475 adds one to the rate difference information.

An initial value of the rate difference information is "0". When a total of the data volume of outputted video data and audio data is larger than a total of the data volume of the video data and audio data received by the functional module card 410, the rate difference information has a positive value. When the total of the data volume of outputted video data and audio data is smaller than the total of the data volume of the video data and audio data received by the functional module card 410, the rate difference information has a negative value. The data rate detector 475 transmits the rate difference information to the sample rate converter 165.

Referring to FIGS. 5 and 6, a digital broadcasting receiving method (including the method of controlling the host apparatus) according to the second preferred embodiment of the present invention will be described. FIGS. 5 and 6 are flowcharts showing the digital broadcasting receiving method according to the second preferred embodiment of the present invention. FIG. 5 is a flowchart showing a processing method including processings executed by the time when the video signal and audio signal (the broadcasting signal) received by the functional module card 410 are transmitted to the host apparatus 460.

Referring to FIG. 5, steps 226 and 227 in FIG. 2 are replaced with steps 526 to 528, and steps 232, 233 and 207 are replaced with steps 532, 533 and 507. The other steps (steps 201 to 206, 221 to 225 and 228 to 231) shown in FIG. 5 are the same as those shown in FIG. 2.

Steps 526 to 528 will be described. In step 526, the video decoder 419 of the decompressor 418 decompresses the video data compressed according to the MPEG2 or MPEG4 system or the like to generate video data. In step 526, the audio decoder 420 of the decompressor 418 decompresses the audio data compressed according to the AAC or MP3 system or the like to generate audio data. The decompressor 418 transmits decompressed video data and audio data to the buffer controller 414. The buffer controller 414 stores the video data and audio data in the buffer memory 415, and memorizes the volume of data stored in the buffer 415 (step 527). The buffer controller 414 judges whether or not the volume of the video data and audio data newly stored in the buffer memory 415 has reached a predetermined volume "R"' (step 528). When the volume of the video data and audio data in the buffer memory 415 has not reached the predetermined volume "R"', the control flow goes back to step 223. When the volume of the video data and audio data in the buffer memory 415 has reached the predetermined volume, the processing goes to step 228. The subsequent processing is similar to that shown in FIG. 2.

Steps 532, 533 and 507 will be described. In step 532, the card controller 116 reads out the video data and audio data from the buffer memory 415 via the buffer controller 414. In step 533, the communication section 117 transmits the video data and audio data to the host controller 161 via at least one line (preferably four lines) of the data lines 143 to 146. The host controller 161 receives the video data and audio data (step 507), and transmits the video data and audio data to the sample rate converter 165.

FIG. 6 is a flowchart showing a method of how the host apparatus 460 processes the video signal and audio signal (the broadcasting signal) transmitted from the functional module card 410. FIG. 6 is obtained by eliminating step 307 for decompressing the compressed video and audio data from FIG. 3, and the other steps are the same as those of FIG. 3.

According to the second preferred embodiment of the present invention, by installing the digital broadcasting receiving function in the versatile functional module card and only by adding the data rate detector 475 and the sample rate converter 165 to a conventional host apparatus, the functional module card can receive the digital broadcasting signal, and the host apparatus 460 can reproduce received terrestrial digital broadcasting signal so that discontinuity (for example, black out, freezing or skipping in video and audio) does not occur.

The host apparatus 460 can carry out the functions of not only the functional module card 410 according to the second preferred embodiment but also the functions (for example, the data storing function of the flash memory 119) of the conventional functional module card connected thereto and having no digital broadcasting receiving function.

In the preferred embodiments, the compression ratios of the video signal and the audio signal are the same. However, the compression ratios of the video signal and the audio signal may have different values. In such a case, in the configurations of the above-mentioned preferred embodiments, each of a video data processing system and an audio data processing system controls the number of samples to be outputted, separately and independently. A signal received by the functional module card may be only video data or only audio data.

In the preferred embodiments, it is assumed that the compression ratio of the video data and the audio data is the fixed value "C". Even when the compressed video data and/or compressed audio data have been subjected to variable-length compression, the same effect as that of the second preferred embodiment is obtained by using the same configuration as that of the second preferred embodiment.

When the compressed video data and/or compressed audio data have been subjected to variable-length compression, an effect similar to that of the first preferred embodiment is obtained by changing the configuration of the first preferred embodiment as described below, for example.

When the compression ratio "C" of compressed video and audio data is not a fixed value, and information about the compression ratio of each frame, for example, is included in the data stream of the broadcasting signal, the host controller 161 preferably receives the information about the compression ratio concurrently with the compressed video and audio data from the functional module card, and transmits the information about the compression ratio to the data rate detector 175.

In another preferred embodiment, the functional module card 110 demodulates the compressed video data and/or compressed audio data having been subjected to variable-length compression, and transmits resultant data to the host apparatus 160. In addition, the functional module card 110 extracts time information (for example, information on the number of frames or time stamp information) included in demodulated terrestrial digital broadcasting signal, and transmits the time information to the host apparatus 160, after transmitting an interrupt signal to the host apparatus 160 or in response to a transmission request from the host apparatus 160. The data rate detector 175 compares the time information of the broadcasting signal received by the functional module card 110 with time information (for example, information on a number of frames that are outputted or time stamp information attached to the video signal and/or audio signal that are outputted) of the video data and/or audio data outputted from the host apparatus 160, and increases or decreases the rate difference information. In response to the rate difference information, the sample rate converter 165 changes the number of samples in the case that the constant volume of the video data and/or audio data is rate-converted.

The rate difference between received data of the functional module card and outputted data of the host apparatus may be detected by using a combination of the time information and the data volume.

The host apparatus 160 may monitor a volume of processed data (for example, a volume of data to be outputted from the decompressor) instead of the volume of the data that were outputted. Since data is usually processed and outputted according to a constant clock, there is a constant relationship between the volume of the outputted data and the volume of the processed data. The same effect is obtained regardless of which volume of data is used.

In the preferred embodiments, upon receiving the interrupt signal from the functional module card, the host apparatus transmits a data (compressed video and audio data or video data and audio data) transmission request command to the functional module card. Alternatively, the host apparatus may transmit a command for requesting a transmission of information on the volume of data received by the functional module card and a data transmission request command to the functional module card at every predetermined time.

Generally speaking, when discontinuity occurs in the audio data, such a sound that is extremely unpleasant to the user is generated, and a degree of unpleasantness is significant in comparison with such a case that discontinuity occurs in the video data. Further, the loudspeaker may be broken. In the first and second preferred embodiments, the video data and audio data are rate-converted by the sample rate converter 165, however, it may be possible to use such a configuration that only the audio data is inputted to the sample rate converter 165.

In the above-mentioned preferred embodiments, the digital broadcasting receiver apparatuses each including the host apparatus and the functional module card are shown. However, the present invention is applicable to any arbitrary electronic apparatus (a host apparatus or another apparatus) that requests an external apparatus (an IC card or another apparatus) to transmit a digital data stream including a video signal and/or an audio signal being continuous relative to the time axis, receives the digital data stream transmitted in response to the request, restores the received video signal and/or audio signal to a continuous signal and outputs a resultant signal.

Although the invention has been described in some detail dealing with the preferred embodiments, the configuration details of any of the preferred embodiments disclosed herein may be changed or modified, and any changes in the combination or order of components thereof can be accomplished without departing from the spirit and scope of the invention as set forth in the appended claims.

INDUSTRIAL APPLICABILITY

The present invention is useful as an electronic apparatus for requesting an external apparatus to transmit a digital data stream including a video signal and/or an audio signal, for receiving the digital data stream transmitted in response to the request, and for outputting the digital data stream, and also useful as a method of controlling the electronic apparatus.

The invention claimed is:

1. An electronic apparatus comprising:
    a communication section for requesting an external apparatus to transmit a digital data stream including a video signal and/or an audio signal which are continuous relative to a time axis, and for receiving the digital data stream transmitted in response to the request,
    a sample rate converter for rate-converting a received video signal and/or audio signal; and
    an output section for outputting the video signal and/or audio signal which are rate-converted and demodulated into a continuous signal,
    wherein, in such a state that a synchronization clock for the video signal and/or audio signal is not outputted from said electronic apparatus, said sample rate converter changes a number of samples to be outputted in the case that a predetermined volume of the video signal and/or audio signal is rate-converted according to a constant sampling clock and outputted, based on:
    (a) time information and/or data volume of the video signal and/or audio signal processed or outputted by the electronic apparatus; and
    (b) time information and/or data volume of the video signal and/or audio signal, which are transmitted from said external apparatus or transmittable from said external apparatus to said electronic apparatus.

2. The electronic apparatus as claimed in claim 1,
    wherein said external apparatus transmits an interrupt signal to said communication section each time when a data volume of the data stream transmittable from said external apparatus to said electronic apparatus reaches a constant volume, and
    wherein said sample rate converter changes the number of samples to be outputted, based on a number of received interrupt signals and a data volume of the video signal and/or audio signal processed or outputted by said electronic apparatus.

3. The electronic apparatus as claimed in claim 2,
    wherein said external apparatus is a receiver apparatus for receiving the digital data stream transmitted from an external thereof, and
    wherein said electronic apparatus has a decoder section or a display section for the video signal and/or audio signal.

4. The electronic apparatus as claimed in claim 2,
    wherein said external apparatus is an IC card, and
    wherein said electronic apparatus is a host apparatus to which said IC card is attached.

5. The electronic apparatus as claimed in claim 1,
    wherein said external apparatus is a receiver apparatus for receiving the digital data stream transmitted from an external thereof, and
    wherein said electronic apparatus has a decoder section or a display section for the video signal and/or audio signal.

6. The electronic apparatus as claimed in claim 1,
    wherein said external apparatus is an IC card, and
    wherein said electronic apparatus is a host apparatus to which said IC card is attached.

7. A method of controlling an electronic apparatus including:
    a communication step of requesting an external apparatus to transmit a digital data stream including a video signal and/or an audio signal which are continuous relative to a time axis, and receiving the digital data stream transmitted in response to the request,
    a sample rate converting step of rate-converting a received video signal and/or audio signal; and
    an outputting step of outputting the video signal and/or audio signal which are rate-converted and demodulated into a continuous signal,
    wherein, in such a state that a synchronization clock for the video signal and/or audio signal is not outputted from said electronic apparatus, said sample rate converting step changes a number of samples to be outputted in the case that a predetermined volume of the video signal and/or audio signal is rate-converted according to a constant sampling clock and outputted, based on:
    (a) time information and/or data volume of the video signal and/or audio signal processed or outputted by the electronic apparatus; and
    (b) time information and/or data volume of the video signal and/or audio signal, which are transmitted from said external apparatus or transmittable from said external apparatus to said electronic apparatus.

8. The method of controlling an electronic apparatus as claimed in claim 7,
    wherein said external apparatus transmits an interrupt signal to said communication section each time when a data volume of the data stream transmittable from said external apparatus to said electronic apparatus reaches a constant volume, and
    wherein said sample rate converting step changes the number of samples to be outputted, based on a number of received interrupt signals and a data volume of the video signal and/or audio signal processed or outputted by said electronic apparatus.

* * * * *